US009429453B1

(12) United States Patent
O'Keeffe et al.

(10) Patent No.: US 9,429,453 B1
(45) Date of Patent: Aug. 30, 2016

(54) METHOD AND SYSTEM FOR MANAGING WATER USAGE

(71) Applicant: Symmons Industries, Inc., Braintree, MA (US)

(72) Inventors: Tim O'Keeffe, Hingham, MA (US); Beth Mercurio, Hingham, MA (US); Kirk Mellits, Braintree, MA (US); Ryan Hall, Marlborough, MA (US); Christina Mendat, Charlotte, NC (US); Christopher Catinella, Marlborough, MA (US); Ben Clement, Acton, MA (US)

(73) Assignee: Symmons Industries, Inc., Braintree, MA (US)

( * ) Notice: Subject to any disclaimer, the term of this patent is extended or adjusted under 35 U.S.C. 154(b) by 0 days.

(21) Appl. No.: 14/667,336

(22) Filed: Mar. 24, 2015

(51) Int. Cl.
G01F 1/34 (2006.01)
G01F 1/68 (2006.01)

(52) U.S. Cl.
CPC .. *G01F 1/34* (2013.01); *G01F 1/68* (2013.01)

(58) Field of Classification Search
CPC .................................. G01F 1/34; G01F 1/68
USPC .......................................................... 702/47
See application file for complete search history.

(56) References Cited

U.S. PATENT DOCUMENTS

| 7,177,725 | B2 | 2/2007 | Nortier et al. |
| 7,360,413 | B2 | 4/2008 | Jeffries et al. |
| 7,940,901 | B2 | 5/2011 | Paraskevakos et al. |
| 8,457,908 | B2 | 6/2013 | Patel et al. |
| 8,554,496 | B2 | 10/2013 | Donnelly et al. |
| 8,572,772 | B2 * | 11/2013 | Wolf et al. .......................... 4/623 |
| 8,600,556 | B2 | 12/2013 | Nesler et al. |
| 8,618,941 | B2 | 12/2013 | Javey et al. |
| 8,761,951 | B2 | 6/2014 | Jerome |
| 2005/0171709 | A1 * | 8/2005 | Nortier ................... E03B 7/071 702/45 |
| 2009/0177594 | A1 | 7/2009 | Williams, Jr. |
| 2010/0076835 | A1 | 3/2010 | Silverman |
| 2011/0031331 | A1 | 2/2011 | Klicpera |
| 2011/0050395 | A1 | 3/2011 | Ervin |
| 2011/0178644 | A1 * | 7/2011 | Picton ........................... 700/282 |
| 2012/0139749 | A1 * | 6/2012 | Belz et al. ................ 340/870.01 |
| 2012/0296799 | A1 | 11/2012 | Playfair et al. |
| 2013/0106616 | A1 * | 5/2013 | Gustafsson et al. ..... 340/870.02 |

(Continued)

FOREIGN PATENT DOCUMENTS

CN 204043740 * 12/2014
GB 2434207 A 7/2007

(Continued)

OTHER PUBLICATIONS

CN 204043740 English Translation.*

(Continued)

*Primary Examiner* — Toan Le
*Assistant Examiner* — Peter Ngo
(74) *Attorney, Agent, or Firm* — Goodwin Procter LLP (57) ABSTRACT

A water usage device for sensing, measuring, collecting, and transmitting water usage data to a remote processing device via a cloud-based communication network and a system for and a method of monitoring and managing water usage in commercial and residential settings that include scheduling preventive maintenance based on current and accumulated water usage data and historical data correlating water usage to repairs.

27 Claims, 3 Drawing Sheets

(56) References Cited

U.S. PATENT DOCUMENTS

| | | |
|---|---|---|
| 2013/0124247 A1 | 5/2013 | Yenni et al. |
| 2013/0144451 A1 | 6/2013 | Kumar et al. |
| 2013/0184838 A1 | 7/2013 | Tchoryk, Jr. et al. |
| 2014/0006235 A1 | 1/2014 | Garg et al. |
| 2014/0058806 A1 | 2/2014 | Guenette et al. |
| 2014/0246099 A1* | 9/2014 | Herbert .................. E03C 1/057 137/78.1 |
| 2015/0000380 A1* | 1/2015 | Cho et al. ......................... 73/40 |

FOREIGN PATENT DOCUMENTS

| | | |
|---|---|---|
| GB | 2488858 A | 9/2012 |
| GB | 2494438 A | 3/2013 |
| JP | 2002215846 A | 8/2002 |
| WO | WO-0246852 A1 | 6/2002 |
| WO | WO-2006073318 A1 | 7/2006 |
| WO | WO-2010039045 A1 | 4/2010 |
| WO | WO-2013030046 A1 | 3/2013 |
| WO | WO-2013048964 A1 | 4/2013 |

OTHER PUBLICATIONS

Amphiro Smart Water Meters flyer on Modules, 4 pages (date unknown).

Amphiro User Manual for amphiro a1, 2 pages (date unknown).

* cited by examiner

METHOD AND SYSTEM FOR MANAGING WATER USAGE

FIELD OF THE INVENTION

The present invention relates to methods and systems for managing water usage and, more particularly, to methods and systems for collecting water usage data for managing water usage in a commercial or residential setting having a multiplicity of water usage devices and a multiplicity of water usage events on each water usage device. The methods and systems can include using water usage data to schedule preventive maintenance to the water usage devices, as well as to the water conduits and/or fixtures to which they are affixed.

BACKGROUND OF THE INVENTION

Water usage devices, commonly, may be affixed to water lines, e.g., pipes, conduits, and the like, between a water supply source and, for example, a shower head, a faucet, a bathtub faucet, a sink faucet, a toilet tank, a urinal, a bidet, and the like. Alternatively, water usage devices may be incorporated or integrated directly into the shower head, bath head, faucet head, etc. In some applications, the devices may be structured and arranged to measure various water usage parameters. For example, in operation, sensing devices may provide water usage data to a microprocessor. The microprocessor, in turn, may collect the water usage data and transmit or report the data elsewhere. In some instances, these data may be displayed on a display device for the user to see while taking a shower, taking a bath, and the like.

Aggregated water usage data collected by water usage devices and reported or transmitted elsewhere may be used for a myriad of purposes. For example, in one application, water usage data may be used to determine when custodial personnel need to replace expendable products such as toilet paper, hand towels, and hand soap. In another application, these data may be used in a cost-benefit analysis to evaluate whether or not consumption costs warrant replacing existing appliances with new, more energy-efficient appliances. In other instances, these data may be used to promote environmentally-driven initiatives that reward energy-conscious users, e.g., hotel guests, for conserving water, the energy needed to heat the water, and the like.

BRIEF SUMMARY OF THE INVENTION

It is desirable to provide a method and a system for collecting and aggregating water usage data for, inter alia, managing water usage in a commercial or residential setting in which there are a multiplicity of water usage devices and a multiplicity of water usage events on each water usage device. Furthermore, it would be desirable to provide a method, system, and device that are brand/system agnostic to facilitate retrofitting an existing water supply system, without requiring an expensive partial or complete renovation. Moreover, it would be desirable to provide methods and systems that gather water usage data to be used in connection with, for example, scheduling preventive maintenance to the water usage devices as well as to the water lines and/or the fixtures to which the water usage devices are affixed or into which the water usage devices are integrated.

In a first aspect, a water usage device disposable on a water supply line between a water supply source and water delivery outlet is provided. In some embodiments, the water usage device includes a memory for storing, during each of many water usage event, water usage data, such as, for example, elapsed time of the water usage event, water flow rate, water pressure, and/or water temperature, a first sensor (e.g., an ultrasonic device, a thermal dispersion device, a Venturi device, a turbine, and a paddlewheel) for measuring, continuously and in real-time, a water flow rate and for providing water flow rate data signals to the microprocessor for storage in the memory; a second sensor for measuring the elapsed time of the water usage event and providing elapsed time data signals to the microprocessor for storage in the memory; a third sensor for measuring, continuously and in real-time, water temperature and providing water temperature data signals to the microprocessor for storage in the memory; a display device for visually displaying, continuously and in real-time, water usage (e.g., flow rate and volume) over time, the elapsed time of the water usage event, the water pressure, and/or the water temperature over time; and a microprocessor for communicating with a remote processor to upload measured water usage parameters. In some implementations, the uploaded measure water usage parameters are adapted for use in a preventive maintenance scheduler and/or are included in a historical database.

In some implementations, the microprocessor may be powered internally, e.g., using water-flow power generation (such as an impeller provided in connection with the first sensor), and/or is adapted to enable a user to pre-set, e.g., using a wireless device (such as a cell phone, tablet computer, and the like), within the memory, a water usage limit, an allowable time of event, and/or water temperature and/or pressure limits, and/or to control a water mixer to vary the mode of water delivery, and/or to provide an emergency cut-off of water flow.

In some implementations, the device also may include a transducer for communicating water usage data via a communication network to the remote processor, where water usage data may be aggregated for use in a myriad of applications. Variations of this implementation may include one or more of: the transducer communicating water usage data using a network protocol selected from the group consisting of radio frequency (RF), ANT+, Bluetooth, BTLE, Z-Wave, 6LoWPAN, WiFi, and ZigBee; the transducer initiating communication of water usage data when the elapsed time of the water usage event exceeds a pre-established amount of time (e.g., about two minutes); the transducer ceasing communication of water usage data after completion of the water usage event or after an interruption in duration in flow rate (e.g., about 30 seconds); and the transducer entering a standby mode at a pre-established time after termination or interruption of the water usage event (e.g., about 45 seconds).

In some variations, the device further includes a fourth sensor for measuring, continuously and in real-time, water pressure and providing water pressure data signals to the microprocessor for storage in the memory.

In some implementations, for example, when there are several water usage devices disposed in a common area, the transducers of some of the water usage devices are further adapted to transmit water usage data signals to a master microprocessor on a master water usage device disposable in a common area and the master microprocessor is further adapted to receive water usage data from the other microprocessors on other water usage devices disposable in a common area with the water usage device.

In a second aspect, a water usage monitoring and management system is provided. In some embodiments, the system includes several water usage devices, each device disposable on a water supply line between a water supply source and a water delivery outlet, a processing device, remotely disposable from the water usage devices for receiving via a communication network water usage data from each of the water usage devices, a data storage device for storing the water usage data, and a preventive maintenance scheduler adapted to schedule maintenance based on water usage data. In some implementations, the water usage devices include a memory for storing, during a water usage event, volumetric flow rate, elapsed time of the water usage event, water pressure, and/or water temperature, a microprocessor adapted to aggregate and store continuous, real-time water usage data and to communicate such data (e.g., by a transducer) to the remote processing device as well as to control a water mixing device, to make adjustments to water flow rate, water temperature, and/or water pressure during the water usage event, and/or to modify a mode of water delivery, and a display device for visually displaying to the user, in real-time, water usage (e.g., total volume and/or flow rate), elapsed time of the water usage event, water pressure, and/or water temperature. In some variations the water usage devices include a temperature measurement device, a pressure measurement device, a flow rate meter and/or a flow volume meter, and a flow duration measurement device, e.g., a timer. The flow rate meter may also power the device by harvesting power through water flow (i.e., hydroelectric power). More specifically, the water usage devices include a first sensor for measuring, continuously and in real-time, a volumetric flow rate and providing measured flow rate data signals to the microprocessor for storage in the memory, a second sensor for measuring the elapsed time of the water usage event and providing elapsed time data signals to the microprocessor for storage in the memory, and a third sensor for measuring, continuously and in real-time, the water temperature and providing the water temperature data signals to the microprocessor for storage in the memory. In some variations, the water usage device further includes a fourth sensor for measuring, continuously and in real-time, water pressure and providing water pressure data signals to the microprocessor for storage in the memory In one implementation, the microprocessor is adapted to enable a user to pre-set (e.g., by a wireless device such as a cell phone, a tablet computer, and the like) within the memory a water usage limit, an allowable time of water usage event, a water pressure limit, a water temperature limit as well as to vary the mode of water delivery.

In some variations, the system optionally includes an edge router(s), which is configured to communicate with discrete water usage devices using, for example, a low-power mesh or WiFi network and which is configured to communicate data from several water usage devices to the remote processing device via the communication network.

In one application, the system further includes a water mixing device for providing to the water delivery outlet a desired flow rate, water pressure, and water temperature and for providing an emergency cutoff capability.

In a third aspect, a method of monitoring and managing water usage and for collecting water usage data from a large number of water usage devices is described. In some embodiments, the method includes receiving (e.g., wirelessly, continuously or periodically and in real-time) water usage data (e.g., water (volumetric) usage, elapsed time of the water usage event, water pressure, and/or water temperature) from the water usage devices, comparing water usage data to pre-established thresholds for water usage parameters, and alerting maintenance personnel to perform preventive or emergency maintenance on any water usage device that exceeds a pre-established usage threshold. In residential settings and optionally in commercial settings, the method may also include communicating water usage data to corresponding users and/or displaying, continuously and in real-time, water temperature data, water pressure data, water flow rate data, and/or water event duration data on a display device viewable by the user.

In a fourth aspect, a system for monitoring and managing water usage for a large number of water usage devices is provided. In some embodiments, the system includes a preventive maintenance scheduler, a programmable processing device, and data storage for storing machine-readable instructions executable by the processing device. When executed, the instructions cause the processing device to receive water usage data from transducers integrated into the water usage devices, to compare water usage data to pre-established thresholds for water usage parameters, and to alert maintenance personnel, by the preventive maintenance scheduler, to perform preventive or emergency maintenance on any water usage device, any fixture to which the water usage device is attached or integrated into, and/or any conduit or water delivery line to which the water usage device is attached having any water usage parameter that exceeds a pre-established usage threshold. In some implementations, the water usage devices include a memory for storing, continuously and in real-time, during a water usage event, water usage data, elapsed time of the water usage event, water pressure data, and/or water temperature data, a display device for visually displaying to the user, in real-time, water usage (e.g., total volume and flow rate), the elapsed time of the water usage event, water pressure, and/or water temperature, and a microprocessor for communicating (e.g., by a transducer) with the remote processing device to upload measured water usage data adapted for use in a preventive maintenance scheduler.

BRIEF DESCRIPTION OF THE DRAWINGS

Further features, embodiments, and advantages of the present invention will become apparent from the following detailed description with reference to the drawings, wherein.

DETAILED DESCRIPTION OF THE INVENTION

The present invention provides a system for collecting water usage data and for communicating such data to a remote site via a communication network, for managing water usage and preventive maintenance purposes in a commercial setting, e.g., a hotel, an apartment complex, a condominium, a casino, and the like, and/or in a residential setting. Although the invention will be described in connection with a commercial setting, the invention is equally usable in a residential setting. Thus, the invention is not to be construed as being limited to a commercial setting.

In some embodiments, the system may include a multiplicity of water usage devices, each of which may be adapted to remotely communicate water usage data that may be sensed, measured, aggregated, and stored locally during a multiplicity of water usage events. For the purpose of this disclosure, a water usage device includes devices for sensing, measuring, recording, and transmitting data collected during a water usage event, e.g., a shower, a bath, a toilet flush, a hand washing in a sink, a car wash, and the like. To enable retrofitting of existing systems, water usage devices may be operably disposed on a water supply or delivery line, e.g., pipe, conduit, outlet arm, and the like, downstream of a water supply source and upstream of a water delivery outlet or device, e.g., a shower head, a faucet, a tub faucet, and the like. Alternatively, or as an option, water usage devices may be integrated or incorporated into the water delivery device itself and/or onto the water supply or delivery line. Although the following description assumes that the water delivery device is a shower head, the invention is not to be construed as being limited only thereto. Indeed, water delivery devices, for the purpose of illustration and not limitation, may also include a bath faucet, a sink faucet, toilet tanks, bidets, and the like.

Figure 1:
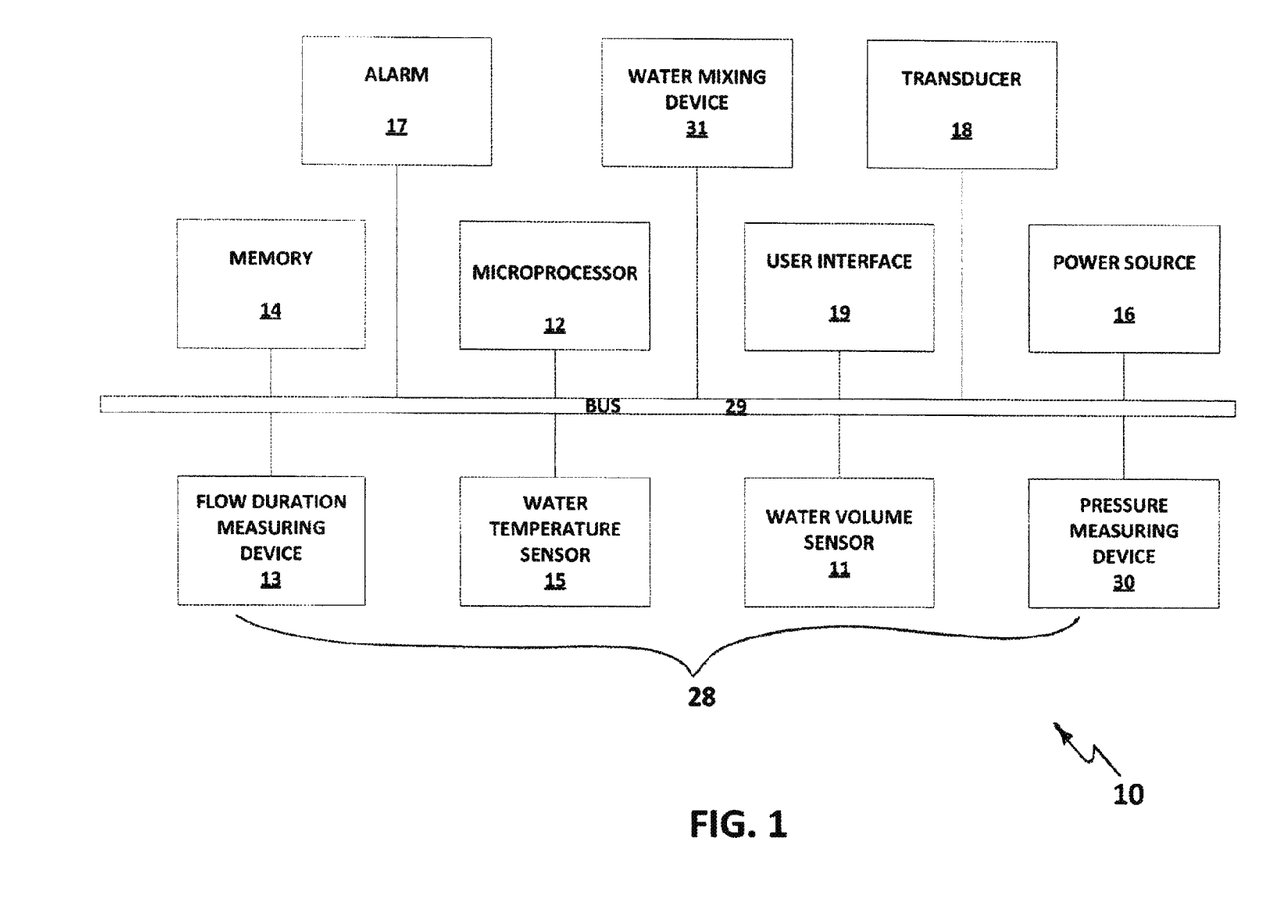
FIG. 1 shows an illustrative embodiment of a water usage device used for generating water usage data and parameters for managing water usage in a commercial or residential setting in accordance with the present invention.

Referring to FIG. 1, an illustrative embodiment of a water usage device 10 for sensing, measuring, collecting, storing, and communicating water usage data, e.g., water usage parameters, for managing water usage in a commercial setting and/or for providing, in real time, water usage data during a water usage event in a residential setting, in accordance with the present invention is shown. In some embodiments, the device 10 includes one or more of a microprocessor 12, memory 14, a power source 16, an alarm 17, a transducer 18, a user interface 19, and plurality of sensors 28. The components of the device 10 are in electronic communication with each other via wireless or hardwired communication. For example, components of the device 10 may be coupled by an interconnection element such as a bus 29. The bus 29 enables communications, e.g., the transfer of data and instructions, to be exchanged, e.g., wirelessly or by hardwire, internally between components and externally to remote systems. Thus, the bus 29 may include one or more physical busses, e.g., between components that are integrated within the device 10, as well as a communication coupling between system elements, e.g., specialized or standard computing bus technologies such as IDE, SCSI, PCI, and InfiniBand.

Due to its frequent hot and humid operating environment, the device 10 may be water tight, e.g., with an ingress protection rating of at least IP67, and may not leak at a (minimum) burst pressure of about 500 psig. The device 10 may be constructed of water (corrosion) resistant materials, e.g., plastic, brass, stainless steel, and the like, and may be capable of withstanding harsh chemicals, e.g., bleach, ammonia, disinfecting sprays, bathroom tile cleaners, water softeners, and so forth, as well as typical shower products, e.g., soap, shampoo, conditioner, and the like. In some implementations, the device 10 may be designed with one or more of the following requirements: operate in a shower setting having a humidity level of 100% (relative humidity); withstand a water pH range between about 6.5 and 8.5; withstand a maximum water chlorine level of about 4 mg/l; withstand a maximum water total dissolvable levels of 500 mg/l; operate in ambient air environment between about 40° F. and about 120° F. (approximately 5° C. and 50° C., respectively); withstand water temperatures between about 40° F. and about 180° F. (approximately 5° C. and 80° C., respectively); and function under a normal working pressure range between about zero (0) and about 80 psig.

Among its many functions, the microprocessor 12 may be structured and arranged to enable, e.g., continuously and in real-time, sensing, measuring, collecting, and storing functions during a water usage event, e.g., a shower, a bath, and so forth, and, furthermore, to communicate, e.g., wirelessly and bi-directionally, with a remote processing device 20 (FIG. 2) for the purpose of uploading measured water usage parameters thereon. Although the following description will describe the uploaded water usage parameters for use in a commercial setting that includes a preventive maintenance scheduler 27, the invention is not to be construed as being limited thereto. Indeed, aggregated water usage data have many residential and commercial uses that include, for the purposes of illustration and not limitation, water use studies, leak or water loss detection, and the like; and to promote environmentally-driven initiatives that reward energy-conscious or thrifty users, e.g., hotel guests, for conserving water, the energy needed to heat the water, and the like. In such instances, rewards may come in the form of monetary prizes, awarding of environmental, "green" points, discounts on future stays at the hotel, and a variety of other incentives.

The microprocessor 12 may include an operating system that manages at least a portion of the hardware elements included therein. Usually, a microprocessor 12 executes an operating system which may be, for example, a Windows-based operating system (e.g., Windows 7, Windows 2000 (Windows ME), Windows XP operating systems, and the like, available from the Microsoft Corporation), a MAC OS System X operating system available from Apple Inc., a Linux-based operating system distributions (e.g., the Enterprise Linux operating system, available from Red Hat, Inc.) or a UNIX operating system available from various sources. Many other operating systems may be used and embodiments are not limited to any particular implementation. Operating systems conventionally may be stored in memory 14.

The microprocessor 12 and the operating system together define a processing platform for which application programs in high-level programming languages may be written. These component applications may be executable, intermediate or interpreted code which communicate over a communication network (for example, the Internet) using a communication protocol (for example, TCP/IP). Similarly, aspects in accordance with the present invention may be implemented using an object-oriented programming language, such as Small-Talk, Java, C++, Ada, or C# (C-Sharp). Other object-oriented programming languages may also be used. Alternatively, functional, scripting, or logical programming languages may be used. For instance, aspects of the system may be implemented using an existing commercial product, such as, for example, Database Management Systems such as SQL Server available from Microsoft Corporation of Seattle, Wash., and Oracle Database from Oracle Corporation of Redwood City, Calif. or integration software such as Web Sphere middleware from IBM Corporation of Armonk, N.Y. However, a computer system running, for example, SQL Server may be able to support both aspects in accordance with the present invention and other databases for unrelated, sundry applications. In one or more of the embodiments of the present invention, the microprocessor 12 may be adapted to execute at least one application, algorithm, driver program, and the like. The applications, algorithms, driver programs, and the like that the microprocessor 12 may process and may execute may be stored in memory 14.

Memory 14 may be used for storing programs and water usage data during operation of the system 100. Memory 14 can be multiple components or elements of a data storage device(s) or, in the alternate, can be stand-alone devices. More particularly, memory 14 can include volatile storage, e.g., random access memory (RAM), and/or non-volatile storage, e.g., a read-only memory (ROM). The former may be a relatively high performance, volatile, random access memory such as a dynamic random access memory (DRAM) or static memory (SRAM). Various embodiments in accordance with the present invention may organize memory 14 into particularized and, in some cases, unique structures to perform the aspects and functions disclosed herein. In some implementations, the device 10 may record water usage data in memory 14 at least once every second.

In one implementation, each device 10 may be provided with sufficient memory 14, e.g., at least one (1) megabit, to store water usage data for multiple water usage events, taken continuously and in real-time, over an extended period of time, e.g., one (1) month.

The water usage device 10 may be self-powered, low-voltage hard wired, and/or low-voltage battery-powered due to the wet and often humid operating environment and the absence of a need of providing hard-wired, high voltage. Suitable power sources 16 may include a low-voltage (e.g., about 5 to 12 VDC) battery source and/or a self-generating power source 16, using, for example, light energy or water flow to generate electrical power. In one adaptation, using an estimated two, ten-minute showers per day as a base, conventional batteries may last for up to 12 months before replacement is required. Advantageously, as will be described in greater detail below, excessive water usage, i.e., in excess of the "base," associated with a discrete device 10 may be detected and preventive maintenance taken, e.g., replace batteries before expiry of 12 months. Alternatively, the device 10 may sense, measure, and communicate the battery power level with every upload to a remote processing device 20.

Self-generating power sources 16 that use water flow or light energy are well-known to the art. In one variation of a water-flow power source 16, an impeller or similar device that is turned by flowing water to generate electrical power may be part of a water-flow sensor 11, described in greater detail below, to reduce costs and the size of the device 10. In some implementations, the device 10 may turn on automatically once water begins to flow.

The transducer 18 may be a, e.g., wireless, bi-directional transmitter and receiver that is capable of communicating with a remote processing device 20. More specifically, transducer 18 (or the device 10) may include an interface to facilitate bi-directional, wireless communication via a communication network 30. The transducer 18 may be structured and arranged to receive signals from the microprocessor 12 and/or data from memory 14 and, furthermore, to transmit, e.g., wirelessly, water usage data to a remote or off-site processing device 20 via a communication network 30; and/or structured and arranged to receive signals, e.g., firmware updates, confirmation signals, and the like, from the remote processing device 20.

In some embodiments, the communication network 30 may be a cloud-based, web-enabled, wireless network, e.g., a local area network (LAN), a wide area network (WAN), a mesh network, a Wi-Fi network, the Internet, the World Wide Web, and so forth. Variations of this implementation may include one or more of the transducers 18 communicating water usage data using a network protocol, e.g., radio frequency (RF), ANT+, Bluetooth, BTLE, Z-Wave, 6LoWPAN, Wi-Fi, and ZigBee. In some implementations, the transducer 18 may be configured to begin communicating water usage data to the remote processing device 20 only after the elapsed time of the water usage event exceeds a pre-defined period of time, e.g., about two minutes. In some variations, the transducer 18 may be structured and arranged to cease transmitting water usage data to the remote processing device 20 after the measured flow rate drops substantially to zero (0) for a pre-determined amount of time, e.g., 30 seconds after each stoppage or interruption. In some variations, the transducer 18 may also be adapted to enter a standby mode at some pre-defined time, e.g., about 45 seconds, after completion or after interruption of the water usage event.

A user interface 19 may be provided to enable users 26 to interact with, e.g., provide input, and observe output, directly from the device 10. User interfaces 19 are well known to the art and will not be described in detail except in connection with the device 10 and system 100 of the present invention. In the current context, in some embodiments, the user interface 19 may provide an interactive display device, e.g., a graphical user interface (GUI), on which the device 10 may visually display to the user 26 some or all of the data sensed and measured by the device 10. For example, the device 10 may be adapted to display, e.g., continuously and in real-time, one or more of: the elapsed time of the water usage event, e.g., shower, bath, and so forth, from the start of the event to the time of the display, the current water temperature, the current water pressure, and/or the current water (volumetric or flow rate) usage. In some implementations, the display of elapsed time may be updated, for example, every one (1) second; the temperature and pressure display may be updated, for example, every two seconds; and the water (volumetric or flow rate) usage may be updated, for example, every three seconds. In one variation, the display may be viewable to the user 26 at a distance of about 24 inches and at an angle +/−45 degrees from the horizontal or perpendicular to the user interface 19.

The input feature of the user interface 19 may be configured to enable a user 26 to input personal, desired water temperature, water pressure, water (total volume and or flow rate) usage, and/or water usage time thresholds. Typical total water (volumetric) usage for a shower may range between 10 and 50 gallons, with an average of about 20 gallons. Typical water usage event times may range between five and 20 minutes, with an average of about eight minutes. Typical water temperatures may range between about 40° F. and 180° F. (about 5° C. and 80° C., respectively). Advantageously, in either a residential or a commercial setting, the device 10 may also be adapted to permit wireless communication between the device 10 and a user's or guest's wireless device, e.g., cell phone, tablet computer, smart phone, laptop computer, personal computer (PC), and the like, to input and pre-set one or more of the water usage thresholds and, optionally, minima and/or maxima limits. The display device may also be configured to display, continuously and in real-time, a visual comparison between the user's personal, desired water usage thresholds and the current sensed data, to show how the user 26 is doing with respect to target thresholds.

Optionally, when one or more thresholds have been exceeded or are being approached, the device 10 may include an alarm 17 feature, to notify the user 26 of the condition or impending condition. Indeed, one purpose of the alarm 17 is to alert the user 26 that the water usage event is nearing or has exceeded one or more of water usage threshold and that the user 26 may consider terminating the water usage event. Alarms 17 may include, for the purpose of illustration and not limitation, visual alarms such as a light of a certain color (e.g., red), a flashing light, and so forth and/or aural alarms that emit a sound, e.g., a bell, a buzzer, a ring, a musical riff, and the like, once a threshold has been exceeded or is being approached. Combinations of alarm types are also possible.

The water usage device 10 includes a plurality of sensors 28 that are structured and arranged to sense, measure, and output data during a water usage event, e.g., a shower, a bath, a flushed toilet, a car wash, and so forth, and to provide water usage data signals to the microprocessor 12. For example, a first type of sensor 11, e.g., an ultrasonic device, a thermal dispersion device, a Venturi device, a turbine, a paddlewheel, and the like, may be adapted to sense and measure water consumption, i.e., water (volumetric) usage, water flow rate, and so forth, continuously and in real-time, during the water usage event. In some implementations, the first type of sensor 11 may be capable of measuring flow rates in a range between about 0.01 gallons per minute (gpm) and about 6 gpm (about 0.04 to about 23 liters per minute), in increments of about 0.01 gpm. After receiving water usage data signals from the first type of sensor, the microprocessor 12 may be adapted to calculate total water consumption, measured in gallons or liters, using measured flow rate and timing data.

Advantageously, if the first type of sensor 11 includes an impeller, e.g., a turbine, a paddlewheel, and so forth, the impeller may also serve as a power source 16 to power the device 10, e.g., by driving an electrical-generating device from the movement of the water and the rotation of the impeller. In the alternative, separate impellers may be provided in the first type of sensor 11 to provide power and to sense and measure water flow rate.

A second type of sensor 13 may be adapted to measure the elapsed time of the water usage event, i.e., water flow duration data. The device 10 may automatically turn on and the elapsed time may begin once water first begins to pass through the first sensor 11 and may end once the water usage event has ended or been interrupted for a pre-determined period of time, e.g. 30 seconds. When the first type of sensor 11 measures water flow rate, the microprocessor 12 may be adapted to calculate total water usage using flow rate data from the first type of sensor 11 and elapsed time data from the second type of sensor 13.

A third type of sensor 15 may be adapted to sense and measure the temperature of the water being delivered at the water delivery device, e.g., head, faucet, and the like. In one implementation, the third type of sensor 15 may be structured and arranged to measure water temperatures in a range between about 40° F. and 180° F. (about 5° C. and 80° C., respectively), with a working range typically between about 80° F. and 110° F. (about 25° C. and 45° C., respectively).

A fourth type of sensor 30 may be adapted to sense and measure the pressure of the water being delivered at the water delivery device, e.g., head, faucet, and the like. In one implementation, the fourth type of sensor 30 may be structured and arranged to measure water pressures in a range between zero (0) pounds per square inch (psig) and about 80 psig (0 to about 5.6 kg/cm$^2$).

Each of the sensors 28 may further be capable of transmitting, e.g., as signals, its respective data to the microprocessor 12. The microprocessor 12 may be adapted to receive and manipulate the data signals, to store new or conditioned data and calculated parameters in memory 14, and to provide the water usage data and/or water usage parameters to the transducer 18 for transmission to the remote processing device 20. In some implementations, the transducer 18 may not transmit water usage data to the remote processing device 20 until the device 10 has operated continuously for a pre-established amount of time, e.g., for at least two minutes and, moreover, to cease transmitting water usage data once the flow rate is substantially zero (0) for a pre-determined amount of time, e.g., 30 seconds.

Although one important function of the device 10 is to sense, measure, collect, and communicate water usage data for managing water usage, for collecting water usage data, and for scheduling preventive maintenance, in some embodiments, especially in residential settings, the device 10 may also be an active control device that can, for example, adjust the hot and cold water mixture, to alter the water temperature, increase or decrease the water flow rate, and/or to vary the mode of water delivery. To adjust the hot and cold water mixture and/or to alter the water flow rate, the device 10 can be in communication, e.g., hardwired or wirelessly, with a water mixing device 31. Varying the mode of delivery may be characterized, for example, as a refresh mode, an energize mode, and a spa mode, which the device 10 may also control via the water mixing device 31. Alternatively, when the device 10 is integrated into the delivery device, the device 10 may vary the mode of delivery at the delivery device itself.

The device 10 may also be configured to provide an emergency shutdown of the water mixing device 31 and water delivery to and at the delivery device, to preclude a sudden, dramatic loss of hot or cold water from negatively impacting the user's water usage event experience. For example, the microprocessor 12 may be adapted to use sensed, sudden or instantaneous variations in water temperature or pressure data that exceed a pre-established variance threshold as a trigger to shut-off the water mixing device 31 and water delivery to and at the delivery device until sensed variations in water temperature or pressure return and remain below the pre-established variance threshold.

Adjusting the water delivery rate—especially in potentially emergency situations—may require the device 10 to shut-off water flow altogether. Such a complete shut-off feature may be necessitated by rogue water events. One such example involves a fixture, e.g., a Roman tub, a Jacuzzi, and the like, having a high volume fill-up capability that far exceeds the draining capacity of the fixture. If unattended, the water may crest the top of the fixture, potentially causing thousands of dollars of damage. As an example, Roman tubs at some hospitality locations, such as casino suites for high rollers, may be designed to fill up in just eight minutes. Hence, in such an application, it would be desirable to be able to alert the user 26, maintenance personnel, or hospitality personnel of the impending cresting of the tub, at about the five or six minute mark, and, moreover, to shut-off the faucet at about the seven minute mark.

Those of ordinary skill in the art can appreciate that all of the sensors 28 may not be necessary for every water usage device. For example, water temperature is of little concern for water usage devices attached to, for example, toilets, urinals, and the like. So, in some instances, it may make economic sense to manufacture a first water usage device model that includes a water temperature sensor 15 with other water sensors and a second water usage device model that does not include the water temperature sensor 15. However, in other instances, rather than manufacturing two separate water usage device models—one with and one without a water temperature sensor 15—it may be more economical to mass produce a single model with all sensors 28 even though all sensors 28 are not required for every water usage application.

Figure 2:
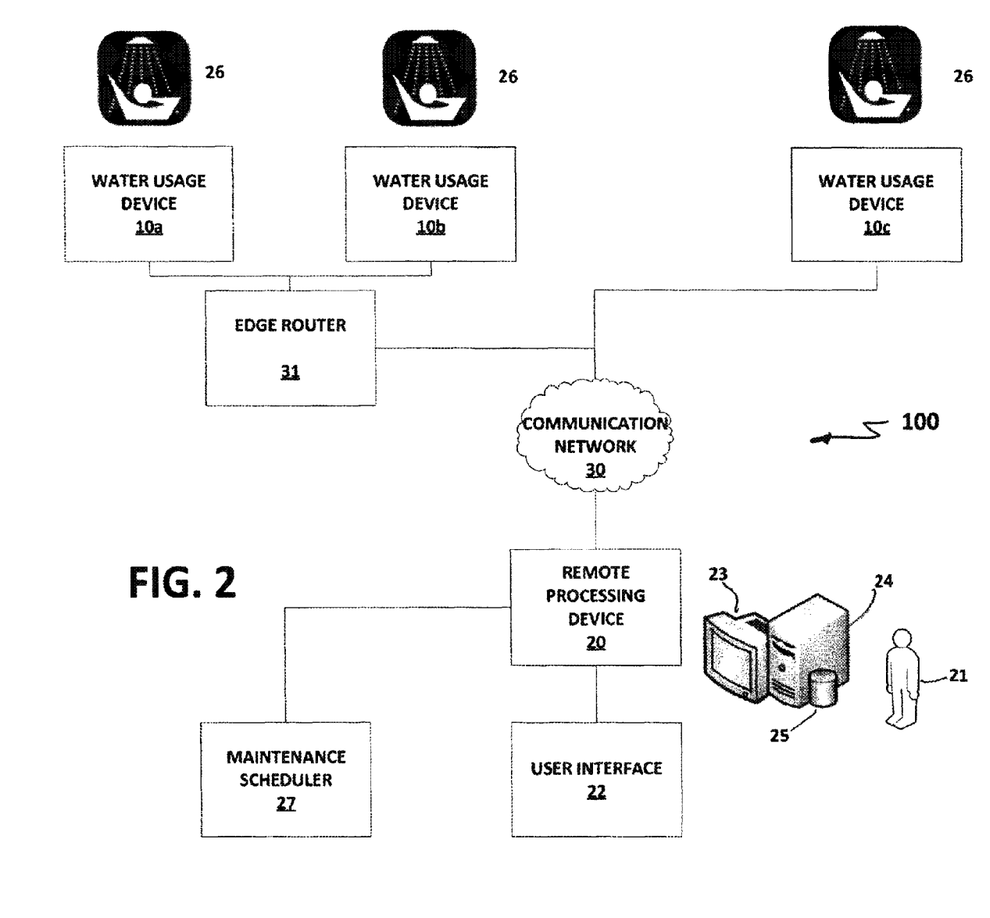
FIG. 2 shows an illustrative embodiment of a system for generating water usage data and parameters for managing water usage in a commercial or residential setting in accordance with the present invention.

In one implementation, when there are a number of water usage devices 10 disposed in a common area (e.g., a single room, adjacent rooms, a single floor, a group of floors, a suite, a wing of room, and so forth), it may be advantageous to configure one of the water usage devices 10, e.g., a "master" device 10 at the shower head, to collect data from the other devices in the common area, to aggregate this collected, common area water usage data with that of the "master" device 10, and to transmit the aggregated water usage data to the remote processing device 20 as described herein. In such an instance, the microprocessors 12 and transducers 18 associated with the other water usage devices 10 in the common area would be configured to transmit data, e.g., wirelessly, to the master device 10 rather than to the remote processing device 20. Moreover, the master device 10 may be configured to aggregate all of the common area water usage data and to transmit the aggregated water usage data to the remote processing device 20.

Referring to FIG. 2, the architecture of an illustrative embodiment of a system 100, e.g., a cloud-based system, for water usage management and control in a commercial or residential setting is shown. In a commercial setting, e.g., a hotel, an office building, a condominium, a casino, an apartment complex, and the like, the system 100 may include a multiplicity of water usage devices 10*a*, 10*b*, and 10*c*. As described above, each of the water usage devices 10*a*, 10*b*, and 10*c* may include a microprocessor 12 and a transducer 18 that are adapted to transmit water usage data and water usage parameters to a remote processing device 20 via a communication network 30, e.g., a cloud-based network. In some instances, to reduce the number of transmissions being sent to the remote processing device 20, one or more edge routers 31 may be included in the system 100. Edge routers 31 are well known to the art and will not be described in great detail. For the purpose of the present invention, each edge router 31 may be adapted to receive water usage data signals from a plurality of transducers 18, to agglomerate the collected data, and to transmit the agglomerated data to the remote processing device 20. Retransmission using an edge router 31 may be executed once a certain volume of data has been collected or may be specified to be transmitted at a specific time and/or frequency.

In some embodiments, the remote processing device 20 may include a central processing unit 24, a data storage device 25, and an input/output device 23, which are all well known to the art. The remote processing device 20 may also include an operating system that manages at least a portion of the hardware elements included therein. Usually, a processing device 20 executes an operating system which may be, for example, a Windows-based operating system (e.g., Windows 7, Windows 2000 (Windows ME), Windows XP operating systems, and the like, available from Microsoft Corporation), a MAC OS System X operating system available from Apple Inc., a Linux-based operating system distributions (e.g., the Enterprise Linux operating system, available from Red Hat, Inc.) or a UNIX operating system available from various sources. Many other operating systems may be used, and embodiments are not limited to any particular implementation. Operating systems conventionally may be stored in the data storage device 25.

The processing device 20 and the operating system together define a processing platform for which application programs in high-level programming languages may be written. These component applications may be executable, intermediate or interpreted code which communicate over a communication network (for example, the Internet) using a communication protocol (for example, TCP/IP). Similarly, aspects in accordance with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used. For instance, aspects of the system may be implemented using an existing commercial product, such as, for example, Database Management Systems such as SQL Server available from Microsoft Corporation of Seattle, Wash., and Oracle Database from Oracle Corporation of Redwood City, Calif. or integration software such as Web Sphere middleware from IBM Corporation of Armonk, N.Y. However, a computer system running, for example, SQL Server may be able to support both aspects in accordance with the present invention and databases for other sundry applications. In one or more of the embodiments of the present invention, the processing device 20 may be adapted to execute at least one application, algorithm, driver program, and the like. The applications, algorithms, driver programs, and the like that the processing device 20 may process and may execute may be stored in the data storage device 25.

The data storage device 25 may be used for storing programs and historical as well as recently received water usage data associated with every water usage device, e.g., as a back-end of a cloud-based data collection service, during operation of the system 100. The data storage device 25 can be multiple components or, in the alternative, can be stand-alone devices. More particularly, the data storage device 25 can include volatile storage, e.g., random access memory (RAM), and/or non-volatile storage, e.g., a read-only memory (ROM). The former may be a relatively high performance, volatile, random access memory such as a dynamic random access memory (DRAM) or static memory (SRAM). Various embodiments in accordance with the present invention may organize the data storage device 25 into particularized and, in some cases, unique structures to perform the aspects and functions disclosed herein.

The remote processing device 20 may also include a user interface 22, e.g., a GUI, that is adapted to graphically display, e.g., for viewing by a user 21, transmitted water usage data. In some variations, the user interface 22 is a browser-based device that may be rendered by the processing device 20. In some implementations, a user 21 may access the browser-based user interface 22 via one or more of a desktop computer, a laptop computer, a tablet computer, a hand-held device, a mobile device, a cellular telephone, a smart telephone, and the like. When the user 21 is a manager or operator of a commercial facility having a multiplicity of water usage devices 10*a*, 10*b*, 10*c*, the water usage data may provide keen insight into water and energy usage of the facility. Moreover, with these data, managers/operators 21 may be able to evaluate consumption on a one-to-one basis (i.e., water usage device by water usage device) or on a one-to-many basis, to identify ways to improve water and energy conservation. Advantageously, these data may also be shared with customer relationship management (CRM) applications and/or may be marketed or used commercially, e.g., as proprietary information for water use studies to estimate and predict usage rates, usage trends, usage variables, for water loss or leakage studies, and so forth. Water usage data may also be used proactively by the managers/ operators 21 of the facility or by facility custodial personnel for the purpose of scheduling preventive maintenance of the water usage devices 10, of the water conduits and/or fixtures (e.g., water delivery devices) to which the devices 10 are attached or integrated into, and so forth. As mentioned above in the description of an exemplary Roman tub, these data may be used to initiate alerts and/or a remote shut-off, to prevent or minimize water damage.

For example, current, accumulated water usage data may be added to, as well as compared to, historical data that are stored in the data storage device 25 and that have been correlated to maintenance issues or problems. Exemplary maintenance issues or problems may include, for the purpose of illustration and not limitation, battery replacement or replacement of some part of the water usage device 10 that wears out after a certain amount of usage (whether time based or cycle based); replacement of all or part of the water delivery device and/or the water conduit (whether time based or cycle based). In this manner, preventive maintenance may be carried out on a particular water usage device 10 or a group of water usage devices 10a, 10b, 10c, water delivery device or groups of water delivery devices, and/or water conduits or water supply/delivery lines that may be approaching a useful life that historically precedes some historical maintenance malfunction or repair; avoiding the more costly, time consuming, and inconvenient after-the-fact repair.

To facilitate this feature, the system 100 may further include a preventive maintenance scheduler 27. The preventive maintenance scheduler 27 may be adapted to schedule preventive maintenance based on water usage data for each water usage device 10, water delivery device, and/or water supply/delivery line. For example, the preventive maintenance scheduler 27 may include a device that compares current and accumulated water usage data with historical water usage and repair data to determine which water usage device 10 or group of water usage devices 10a, 10b, 10c, and/or water conduits, and/or fixtures (e.g., delivery devices), to which the water usage devices 10 are attached or integrated into, require preventive maintenance or replacement. Additionally, the preventive maintenance scheduler 27 may include a paging, emailing, calling, and/or texting feature that automatically prepares and transmits a maintenance alert or request, e.g., via a page, an email, a call, a text, and the like, to appropriate custodial personnel who, in turn, may effect the necessary repairs.

Having described a water usage device for sensing, measuring, collecting, and transmitting water usage data to a remote processing device and a system for water management and control, a method of monitoring and managing water in a commercial setting will now be described. Here again, although the following description assumes a commercial setting, those skilled in the pertinent art can appreciate the applicability of the teachings to residential settings, as well.

As previously mentioned, in a commercial setting, there may be a multiplicity of water usage devices, each of which may include a plurality of sensors, a microprocessor, and a transducer for sensing, measuring, collecting, and transmitting water usage data to a remote processing device. The plurality of sensors may include a first sensor for measuring, continuously and in real-time, a water flow rate and providing the water flow data signals to the microprocessor for storage in the memory, a second sensor for measuring the elapsed time of the water usage event and providing elapsed time data signals to the microprocessor for storage in the memory, a third sensor for measuring, continuously and in real-time, the water temperature and providing water temperature data signals to the microprocessor for storage in the memory, and, optionally, a fourth a third sensor for measuring, continuously and in real-time, water pressure and providing water pressure data signals to the microprocessor for storage in the memory.

As previously mentioned, if there are a number of water usage devices in a common area, a master device may collect and agglomerate data transmitted by each of the other devices in the common area and may transmit the agglomerated data for all of the devices in the common area to the remote processing device. It should be noted that in some implementations, these data are referenced to the generating water usage device as well as the location of the water usage device, e.g., the shower in Room 222, the toilet in the third floor latrine, the bidet in the Presidential Suite, and so forth.

Once these data have been collected and stored, e.g., as new or conditioned data and/or as calculated parameters, in the memory, the data may be transmitted, e.g., by the transducer via a communication network, to the remote processing device. Alternatively, the data from a plurality of transducers may first be transmitted to an edge router that, in turn, may agglomerate the data from the plurality of transducers and transmit the agglomerated data to the remote processing device. In some implementations, the transducer may not begin communicating water usage parameters to the remote processing device (or the edge router) until the elapsed time of the water usage event exceeds a pre-established period of time, e.g., about two minutes. Furthermore, data transmission from the transducers may occur at a specific time or frequency, e.g., after the measured water flow rate is substantially zero (0) for a pre-established amount of time, e.g., 30 seconds. If data are transmitted first to an edge router, then the edge router may begin communicating water usage data and parameters to the remote processing device at a pre-established period of time and/or frequency.

The transducer may communicate water usage data and parameters using a network protocol such as radio frequency (RF), ANT+, Bluetooth, BTLE, Z-Wave, 6LoWPAN, Wi-Fi, and ZigBee.

Figure 3:
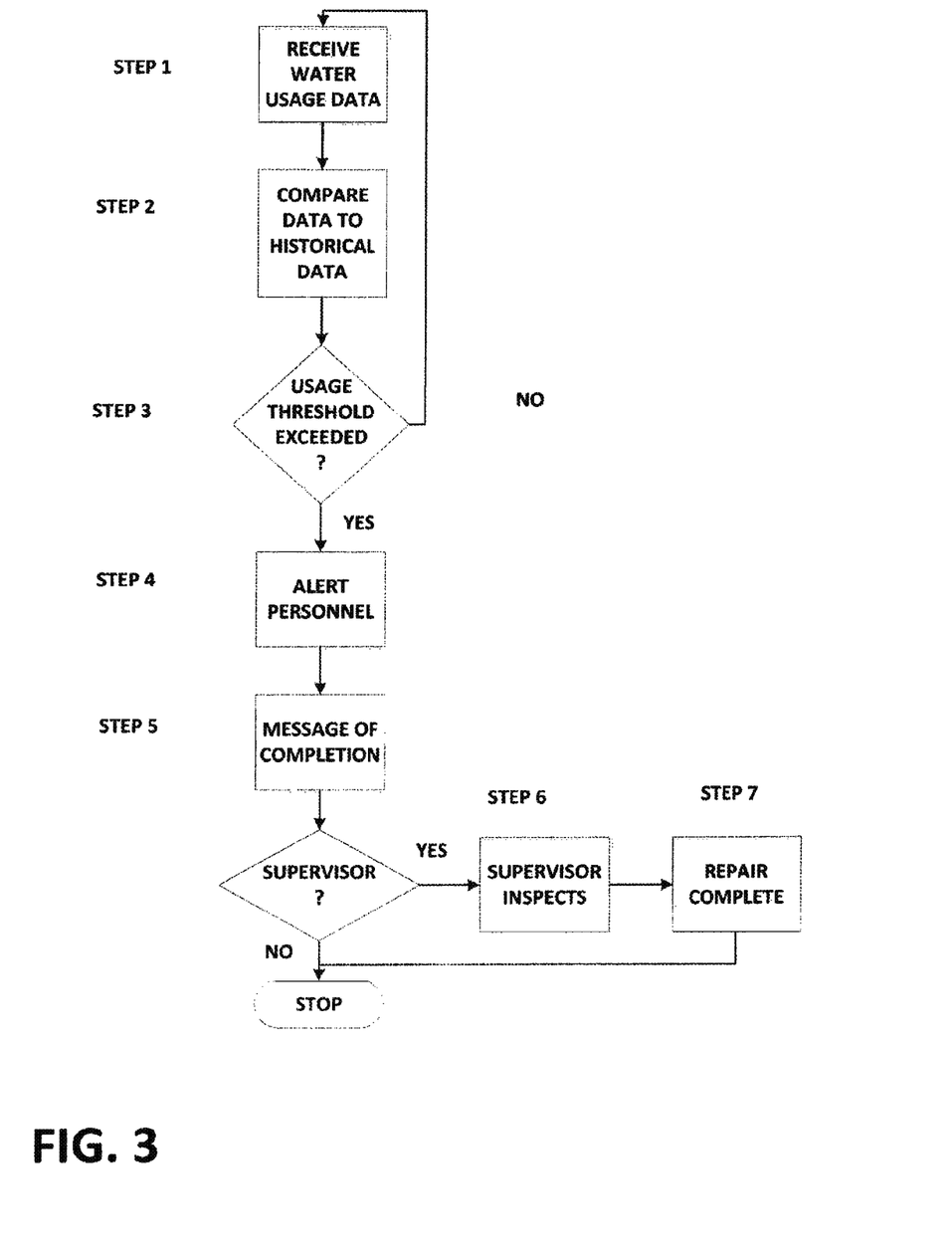
FIG. 3 shows a flow chart of an illustrative method of measuring and collecting water usage data for a multiplicity of water usage devices for preventive maintenance purposes in accordance with the present invention.

Referring to FIG. 3, in a first step, the remote processing device receives, e.g., directly from each transducer of each water usage device that has experienced a water usage event that has lasted at least, for example, two minutes, or directly and indirectly from one or more transducers of one or more master water usage devices that have aggregated water usage event from a plurality of water usage devices disposed in a common area, or indirectly via one or more edge routers that have received water usage data from a plurality of water usage devices and has transmitted these data in accordance with a pre-established time or frequency, water usage data from each of the multiplicity of water usage devices (STEP 1). At the remote processing device, these data may be stored, e.g., in a data storage device, and compared to historical water usage data that may also be stored in the data storage device (STEP 2). In some applications, these data may also be added to the historical water usage data.

In some variations, the historical water usage data includes correlations, i.e., pre-established thresholds for usage, of the water usage parameters to maintenance repairs. For example, exemplary preventive maintenance may include, for the purpose of illustration and not limitation: replace water usage device and/or water delivery device (e.g., shower head) after X hours of accumulated operations, replace batteries (e.g., of water usage device) after Y hours of operation, replace delivery device (e.g., shower head)

gaskets after Z hours of operation at or above T degrees Fahrenheit, clean lime from shower- or bath-head after G gallons of water have been delivered to users, and so forth.

If any of the pre-established water usage preventive maintenance thresholds have been exceeded (STEP 3), maintenance personnel can be automatically alerted of the need to perform preventive maintenance (STEP 4) on a water usage device, a water delivery device, and/or a water conduit. Alerts may be provided to the maintenance or custodial personnel via emails, pages, text messages, Tweets, telephone calls, and so forth. Advantageously, the alert can include the location(s) of the water usage device(s), the type of water usage device, water delivery device, and/or water conduit needing attention, the needed maintenance, and so forth.

Once the preventive maintenance has been completed, the maintenance performer may be able to provide a message, e.g., via email, page, text message, Tweet, telephone call, and so forth, back to the users at the remote processing device, informing them of the completion of the task (STEP 5). Advantageously, the message (STEP 5) may include the time to effect the repair, the number of personnel involved, and a list of materials used in the repair. These data, in turn, may be used for the purpose of estimating maintenance costs and time to repair for each type of repair as well as any relevant, corresponding water usage data.

Depending on the nature and/or the criticality of the repair, once the maintenance performer has sent a completion message (STEP 5), a supervisor may be notified (STEP 6), e.g., via email, page, text message, Tweet, telephone call, and so forth, to inspect the work. Once the supervisor's inspection of the repair work has been completed, the supervisor may also be able to provide a message, e.g., via email, page, text message, Tweet, telephone call, and so forth, back to the users at the remote processing device, informing them of the results (e.g., completed or incomplete) of the inspection (STEP 7).

Those of ordinary skill in the art may realize that the invention may be embodied in other specific forms without departing from the spirit or essential characteristics thereof. The foregoing embodiments, together with the attached drawings, are, therefore, to be considered in all respects illustrative rather than limiting of the invention described herein.

Various combinations and permutations of some or all of the structural elements and process steps are possible and contemplated, and are all considered to be within the scope of the invention.

What is claimed is:

1. A water usage device disposable on a water supply line between a water supply source and a water delivery device, the water usage device comprising:
   a memory for storing, during a water usage event, at least one of water usage, elapsed time of the water usage event, water pressure, and water temperature;
   a first sensor for measuring, continuously and in real-time, a volumetric flow rate and providing measured volumetric flow rate data signals to a microprocessor for storage in the memory;
   a second sensor for measuring the elapsed time of the water usage event and providing measured elapsed time data signals to the microprocessor for storage in the memory;
   a third sensor for measuring, continuously and in real-time, the water temperature and providing measured water temperature data signals to the microprocessor for storage in the memory;
   a display device for visually displaying, in real-time, at least one of water usage, the elapsed time of the water usage event, and water temperature; and
   a microprocessor for communicating, by a transducer via a communications network, with a remote processor to upload measured water usage parameters adapted for use in a preventive maintenance scheduler structured and arranged for the purpose of scheduling preventive maintenance to address at least one of maintenance issues, maintenance problems, and a useful life of at least one of the water supply line and the water delivery device, wherein the transducer is configured to:
   begin communicating water usage parameters when the elapsed time of the water usage event exceeds a preset limit, and
   cease communicating water usage parameters after at least one of completion and interruption of the water usage event.

2. The device of claim 1, wherein the first sensor is selected from the group consisting of an ultrasonic device, a thermal dispersion device, a Venturi device, a turbine, and a paddlewheel.

3. The device of claim 1, wherein the microprocessor is adapted to enable a user to pre-set within the memory at least one of a water usage limit, an allowable time of the water usage event, and a maximum water temperature during the water usage event.

4. The device of claim 1, wherein the transducer communicates water usage parameters using a network protocol selected from the group consisting of radio frequency (RF), ANT+, BTLE, Z-Wave, 6LoWPAN, and WiFi.

5. The device of claim 1, wherein the transducer enters a standby mode after at least one of completion or interruption of the water usage event.

6. The device of claim 1, wherein the device is self-powered using water-flow power generation.

7. The device of claim 1, wherein the first sensor is further adapted to generate power.

8. The device of claim 1, wherein the microprocessor is further adapted to vary a mode of water delivery.

9. The device of claim 1, wherein the microprocessor is further adapted to provide an emergency cut-off of water flow during a water usage event.

10. The device of claim 1, wherein the microprocessor is further adapted to receive water usage data from at least one other microprocessor on another water usage device disposed in a common area with the water usage device.

11. The device of claim 1, wherein the transducer is further adapted to transmit water usage data to another microprocessor on another water usage device disposed in a common area with the water usage device.

12. The device of claim 1 further comprising a fourth sensor for measuring, continuously and in real-time, water pressure and providing measured water pressure data signals to the microprocessor for storage in the memory.

13. A water usage monitoring and management system comprising:
   a first plurality of water usage devices, each device disposable on a water supply line between a water supply source and a water delivery device;
   a processing device, disposed remote from the first plurality of water usage devices, for receiving, via a communication network, water usage data from each of the water usage devices;

a data storage device for storing the water usage data; and
a preventive maintenance scheduler adapted to schedule preventive, proactive maintenance based on water usage data, wherein the preventive maintenance scheduler is adapted to:
  receive historical preventive maintenance and repair data correlating water usage data to at least one of an historical maintenance issue and an historical maintenance repair for a plurality of water usage devices;
  compare water usage data from the first plurality of water usage devices to the historical preventive maintenance and repair data; and
  alert maintenance personnel to at least one of:
    proactively replace at least one of a water usage device and a water supply line prior to a malfunction thereof, and
    proactively perform preventive maintenance on at least one of a water usage device and a water supply line prior to a malfunction thereof, based at least in part on the comparison.

14. The system of claim 13, wherein each of the plurality of water usage devices comprises:
a temperature measurement device;
a pressure measurement device;
at least one of a flow rate meter and a flow volume meter; and
a flow duration measurement device.

15. The system of claim 14 further comprising a water mixing device.

16. The system of claim 15, wherein each of the first plurality of water usage devices comprises a microprocessor that is adapted to control the water mixing device to make adjustments to at least one of water flow rate, water pressure, and water temperature during the water usage event.

17. The system of claim 15, wherein each of the first plurality of water usage devices comprises a microprocessor that is adapted to control the water mixing device to modify a mode of water delivery.

18. The system of claim 14 further comprising a plurality of edge routers, each router of the plurality of edge routers configured to communicate with a second plurality of water usage devices.

19. The system of claim 18, wherein each of the plurality of edge routers is configured to communicate data from a corresponding second plurality of water usage devices to the remote processing device via the communication network.

20. The system of claim 13, wherein each of the plurality of water usage devices comprises:
a memory for storing, during a water usage event, at least one of water usage, elapsed time of the water usage event, water pressure, and water temperature;
a microprocessor for communicating water usage data to the remote processing device for use by the preventive maintenance scheduler; and
a display device for visually displaying, in real-time, at least one of water usage, elapsed time of the water usage event, water pressure, and water temperature.

21. The water usage monitoring and management system of claim 20, wherein each of the water usage devices further comprises:
a first sensor for measuring, continuously and in real-time, volumetric flow rate providing measured volumetric flow rate data signals to the microprocessor for storage in the memory;
a second sensor for measuring the elapsed time of the water usage event and providing measured elapsed time data signals to the microprocessor for storage in the memory; and
a third sensor for measuring, continuously and in real-time, water temperature and providing measured water temperature data signals to the microprocessor for storage in the memory.

22. The system of claim 21 further comprising a fourth sensor for measuring, continuously and in real-time, water pressure and providing measured water pressure data signals to the microprocessor for storage in the memory.

23. The system of claim 21, wherein the microprocessor is adapted to enable a user to pre-set within the memory at least one of a water usage limit, an allowable time of water usage event, a water pressure limit, and a water temperature limit.

24. A method of monitoring and managing water usage for a multiplicity of water usage devices, the method comprising:
receiving water usage data from each of the multiplicity of water usage devices;
receiving historical preventive maintenance and repair data correlating water usage data to at least one of an historical maintenance issue and an historical maintenance repair for a plurality of water usage devices;
comparing water usage data to the historical preventive maintenance and repair data;
alerting maintenance personnel to at least one of:
  proactively replace at least one of a water usage device and a water supply line prior to a malfunction thereof, and
  proactively perform preventive maintenance on at least one of a water usage device and a water supply line prior to a malfunction thereof, based at least in part on the comparison.

25. The method of claim 24, wherein water usage data includes at least one of water usage, water flow rate, elapsed time of the water usage event, water pressure, and water temperature.

26. The method of claim 25 further comprising communicating water usage data to corresponding users and displaying at least one of water temperature data, water pressure data, water flow rate data, water usage, and elapsed time of the water usage event on a display device.

27. A system for monitoring and managing water usage for a multiplicity of water usage devices, the system comprising:
a preventive maintenance scheduler;
a programmable processing device; and
data storage for storing machine-readable instructions executable by the processing device, wherein, when executed, the instructions cause the processing device to:
receive water usage data from each of the multiplicity of water usage devices;
receive historical preventive maintenance and repair data correlating water usage data to at least one of an historical maintenance issue and an historical maintenance repair for a plurality of water usage devices;
compare water usage data to the historical preventive maintenance and repair data; and
alert maintenance personnel via the preventive maintenance scheduler to at least one of:
  proactively replace at least one of a water usage device and a water supply line prior to a malfunction thereof, and proactively perform preventive maintenance on at least one of a water usage device and a water supply line prior to a malfunction thereof based at least in part on the comparison.

\* \* \* \* \*